United States Patent [19]

Herndon et al.

[11] 4,409,670
[45] Oct. 11, 1983

[54] SOLID-STATE DIGITAL FLIGHT DATA RECORDER

[75] Inventors: James A. Herndon, Suffield; Henry R. Ask, South Windsor, both of Conn.

[73] Assignee: United Technologies Corporation, Hartford, Conn.

[21] Appl. No.: 277,545

[22] Filed: Jun. 26, 1981

[51] Int. Cl.³ .......................... G11B 5/02; G09F 3/00
[52] U.S. Cl. ........................................ 364/900; 360/5
[58] Field of Search .................... 360/89, 5; 364/200 MS File, 900 MS File, 424, 556, 557; 73/488, 489, 491, 181; 369/20

[56] References Cited

U.S. PATENT DOCUMENTS

| | | | |
|---|---|---|---|
| 2,992,296 | 7/1961 | Albrecht | 360/5 |
| 3,327,067 | 6/1967 | Boniface | 360/5 |
| 3,461,429 | 8/1969 | Gray | 360/5 |
| 3,581,014 | 8/1971 | Vogel | 369/21 |
| 3,712,122 | 1/1973 | Harris | 73/492 |
| 3,783,197 | 1/1974 | Towner | 360/5 |

FOREIGN PATENT DOCUMENTS 1520251  8/1978  United Kingdom ............ 360/5

OTHER PUBLICATIONS

Developments in Airborne Crash Recorders, "Proceedings of the 6 International Aerospace Instrumentation Symposium", Vatinelle, Mar. 1970.

Primary Examiner—Gareth D. Shaw
Attorney, Agent, or Firm—Dominic J. Chiantera

[57] ABSTRACT

A digital flight data recorder receives sensed parameter information in serial data format in successive data frames and first circulates the information in a first-in first-out (FIFO) sequence through a minor memory to preserve the data received over a most recent real time interval, after which the data is compressed to a smaller data base including periodic slow interval samples and intermediate exceedance parameter samples which are stored in a major memory for later retrieval.

17 Claims, 6 Drawing Figures

SOLID-STATE DIGITAL FLIGHT DATA RECORDER

TECHNICAL FIELD

This invention relates to data recording, and more particularly to aircraft flight data recorders.

BACKGROUND ART

Present state of the art flight data recorders may be classified into the major categories of electromechanical recording devices and solid-state memory devices. The electromechanical recording devices represent the majority, being used on both civil and military aircraft. They may be either of two types: analog foil recorders or digital magnetic tape recorders.

In the analog foil recorders the parameter data to be recorded is in analog form, and is continuously recorded by engraving the value of the parameter on a metallic foil record with scribers. The scribers are actuated by the sensed parameter magnitude and time correlation is provided by a constant speed drive of the foil, which is marked by a separate time scribe. These recorders can record only a limited number of flight parameters, but provide continuous recording for extended time intervals e.g. over 400 hours for commercial aircraft. Their disadvantages lie in their large size and weight, the limited parameter recording, their low reliability due to the large number of mechanical parts, and the need to remove and replace the foil cartridge at the end of the recording interval. This combined with high periodic maintenance costs make them impractical for smaller civil and military aircraft in which the flight profiles (recording time intervals) are much smaller than that required in the commercial field.

In the digital magnetic tape recorders, or Digital Flight Data Recorders (DFDR), the sensed analog parameters are converted to a digital format and continuously recorded on magnetic tape. The digital data is in a serial binary form from an intermediate data acquisition unit (DAU). The recording capacity of these DFDR type recorders is 25 hours. Since they are also electromechanical they suffer from the same degradation in reliability common to the metal foil recorders, and are also large and bulky due to the tape storage and motor drive elements required by the system. As such they also have limited practical use on small civil and military aircraft.

The other type of flight recorders, e.g. the newer type solid-state flight data recorders, eliminate the mechanical disadvantages of the electromechanical devices, and are made possible by the rapid progress in technology of integrated circuit (IC) memory devices. These memory devices used include both volatile memories (lose the stored data when power is removed) such as RAMs and CCDs (charge coupled device) and nonvolatile memories such as a ROM, PROM, EAROM (electrically alterable read only memory), $E^2ROM$ (electrically erasable programmable read only memory) and magnetic bubble memory devices. Only the nonvolatile devices that can be written over in situ are suitable for recording flight data in a permanent storage capability for later readout by ground based equipment.

While providing higher reliability and lower size and weight than the electromechanical recorders, the present solid-state recorders have a limited ability for continuous recording over extended time intervals. This results from the limitation on bit storage capacity of the solid-state memory devices. For a serial binary, twelve bit word received at 64 words per second, the signal bit times are 768 BPS, 46.08 KBPM and 2.8 MBPH; a 25 hour continuous recording interval requires 70 megabits of storage. Even with magnetic bubble memories, which provide the highest bit storage density per unit cost among nonvolatile memory devices, the present state of the art bit storage capacity is on the order of one megabit per device. As such, a 25 hour recording interval requires 70 bubble memories, which is impractical.

In order to make the solid-state recorders practical, a recording scheme is required which reduces the necessary solid-state memory sizes. Of course this must be done without sacrificing the integrity of the recorded data so as to allow for an accurate reconstruction of data during an accident investigation procedure.

DISCLOSURE OF INVENTION

The object of the present invention is to provide a solid-state digital flight data recorder (SSDFDR) capable of providing extended information interval recording with a minimum number of memory storage devices.

According to the present invention, the sensed parameters to be recorded are received as serial bit stream data words formatted in successive data frames interspersed with time synchronization (synch) words, and are circulated through a minor memory in a first in first out (FIFO) manner to preserve the data received over a most recent selected time interval, following the minor memory circulation the data is compressed to a smaller data base which includes periodic slow time interval samples combined with intermediate exceedance parameter samples and stored in a major memory for later retrieval. In further accord with the present invention, the compressed data is selectively tagged for permanent protection, the protected and nonprotected compressed data being circulated in a FIFO manner through the major memory for a second selected time interval following which the protected compressed data is recycled through the major memory and the nonprotected data is discarded.

The solid-state digital flight data recorder (SSDFDR) of the present invention provides a smaller size, higher reliability flight data recorder than that presently available with the prior art electromechanical recorders. The most recent received data is first recorded, as received for a selected recent time interval established as that value considered necessary for accident investigation. In addition, the recognized critical flight modes, e.g. takeoff and landing may be selectively tagged as protect data and continuously recycled through the major memory storage loop for later ground readout. In this manner only important flight data is stored for later analysis while the unimportant data, which comprises the vast majority of the continuously recorded data, is discarded. This results in a typical reduction in stored data memory size of thirty-five to one.

These and other objects features and advantages of the present invention will become more apparent in light of the following detailed description of a best mode embodiment, as illustrated in the accompanying Drawing.

BRIEF DESCRIPTION OF DRAWING(s)

BEST MODE FOR CARRYING OUT THE INVENTION

Figure 1:
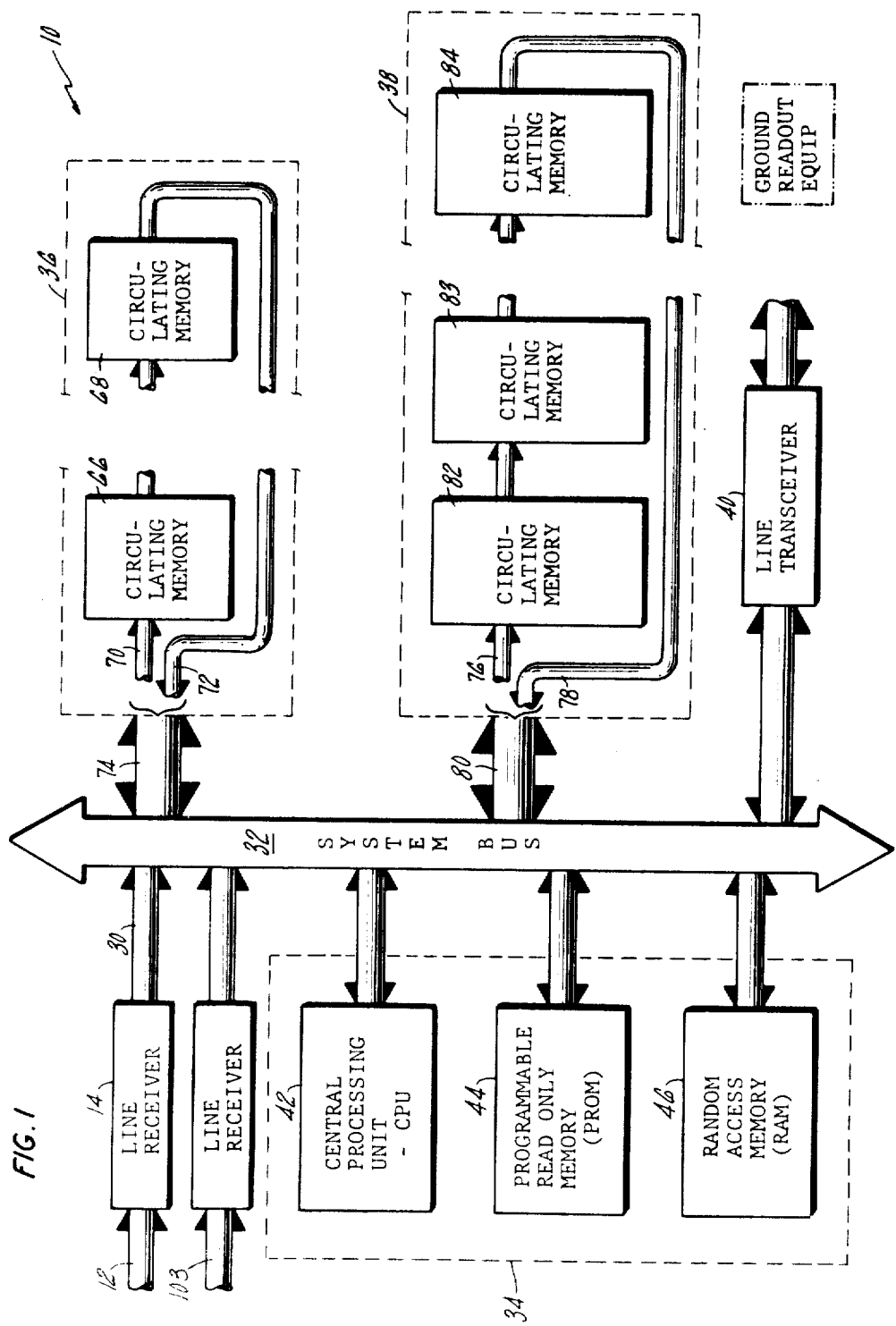
FIG. 1 is a system block diagram of a solid-state digital flight data recorder according to the present invention.
Figure 2:
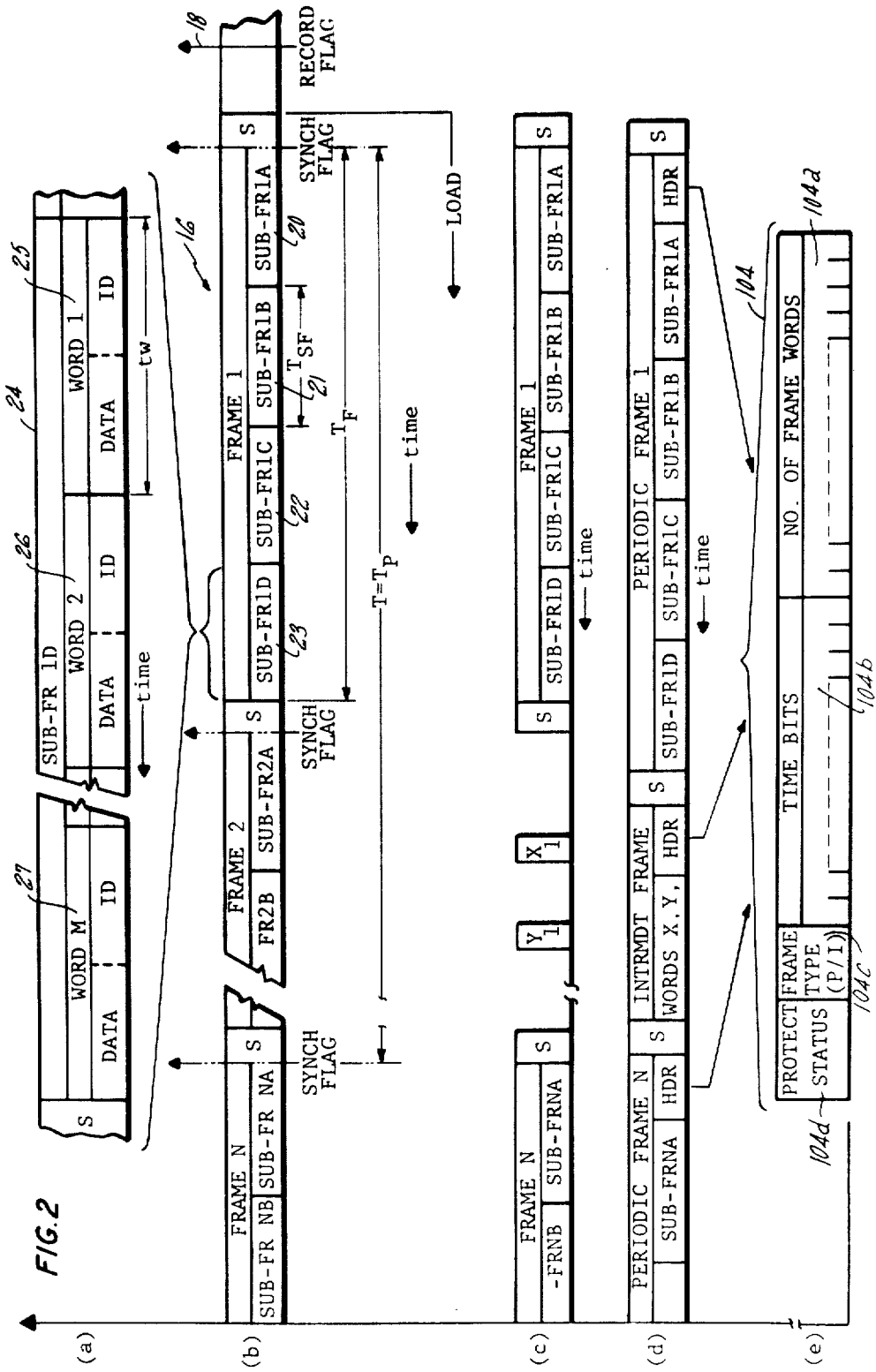
FIG. 2 is an illustration of signal waveforms used in the description of the embodiment of FIG. 1.

FIG. 1 is a system block diagram of a best mode embodiment of the solid-state digital flight data recorder of the present invention. The recorder 10 receives the sensed data from a digital flight data acquisition unit (DFDAU), not shown, which provides the data as a serial binary data stream on lines 12 to a line receiver 14 in the recorder. FIG. 2, illustration (b) shows a typical input data format 16 in which the serial data frames 1 through N are numbered with respect to some initial state for a present recording interval, such as a Record Flag 18. It should be understood, however, that the initial state is arbitrary, e.g. the recorder may operate continuously in both the flight and ground modes. The format typifies that defined by ARINC specifications in which the frames (1—N) are divided into quarter subframes (Sub-Fr 1A-1D, 20-23 for frame 1). Synch words 24-26 are interposed with the data frames. Illustration (a) shows a typical subframe format with subframe ID having M number of data words, each including parameter ID and parameter data bits. The word time is $t_w$, the subframe time $T_{SF}$, and the frame time interval $T_F$.

The line receiver 14 conditions the data and presents it on lines 30 to the recorder system bus 32, which interconnects the remaining system major components including: the signal processor 34, the minor and major memories 36, 38, and a line transceiver 40. The signal processor 34 includes a microprocessor central processing unit (CPU) 42 of a type known in the art, such as the Intel 8085 ®. The exact type of CPU, however, is whatever type is deemed suitable by those skilled in the art for use in the particular data recorder application, e.g. number of sensed parameters, rate of word data input etc. The CPU may be used with any of the programming techniques and program listings known to those skilled in the art of computer programming. The processor also includes a programmable read only memory (PROM) 44 for storing the CPU program listing, and a random access memory (RAM) 46 which is used for interim data storage of input parameter values in conjunction with the data compression routine performed by the recorder. The PROM program listing includes the data compression routine and interrupt modes used by the CPU in recording the input data in the minor and major memories.

Figure 3:
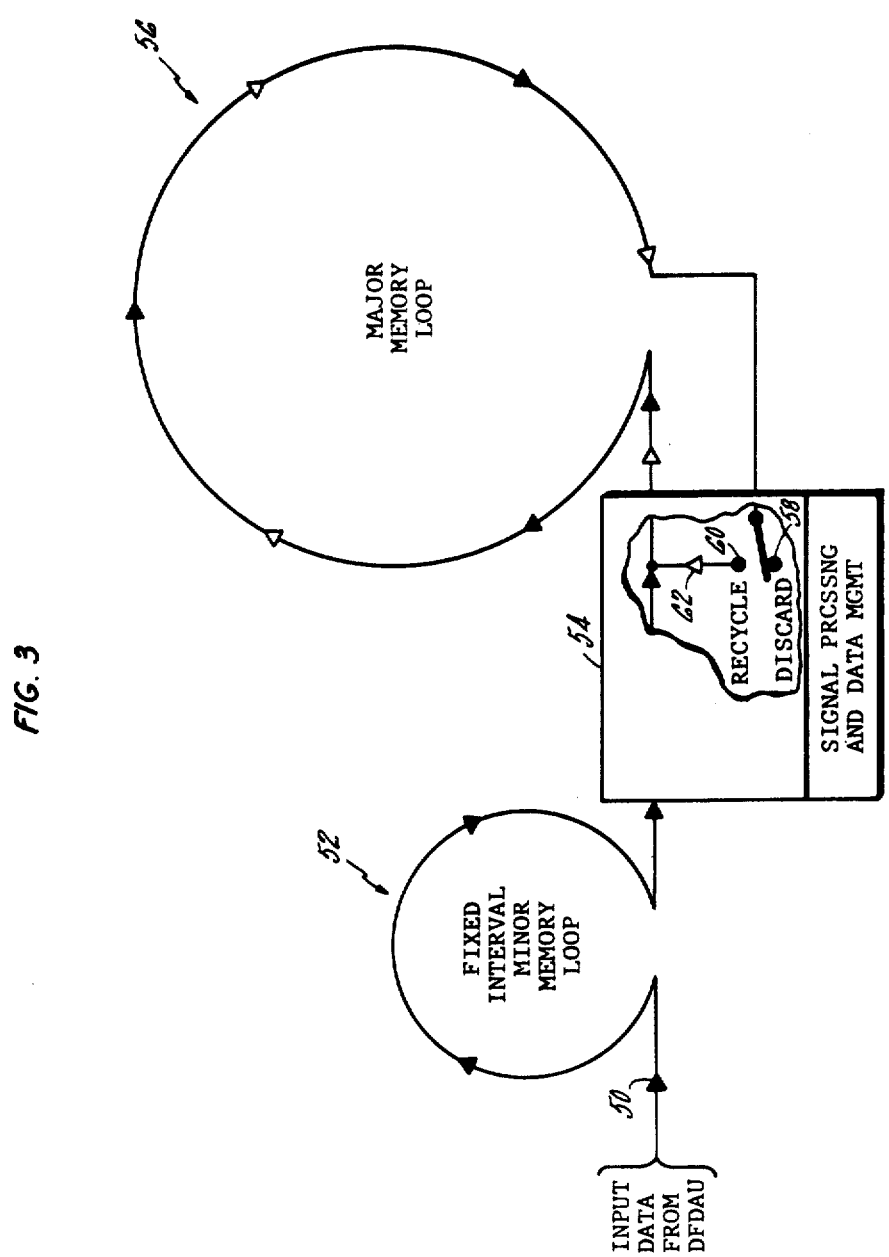
FIG. 3 is a simplified functional diagram of the recording architecture of the system of FIG. 1.

The minor and major memories provide the essential novelty in the present recording system architecture, as illustrated in the simplified functional schematic diagram of FIG. 3. All of the input data 50 is first recorded intact, without alteration in the minor loop 52 for a fixed time interval. This is achieved by circulating the data, serially as received, through the memory at a propagation rate corresponding to the data input rate. Following propagation through the minor memory it is compressed, discriminately tagged as PROTECT data by the data management routines 54 and inserted into the major memory 56 where it is circulated at a variable propagation rate and then recycled 58 as PROTECT DATA 60, or discarded 62. The selected time interval associated with the data propagation through the minor memory is for a fixed input data rate, established by the bit storage capacity of the minor loop memory device. As such, it is a tradeoff between that time interval value considered most important in accident investigation procedures and the required size of the memory device. For most aircraft this time interval is typically ten to fifteen minutes. The time required for the compressed data to propagate through the major memory varies; it is dependent on the rate at which the compressed data is loaded in and the amount of PROTECT data that must be recycled. In real time capacity it is longer than that of the minor loop. The recycled, protected compressed data is multiplexed into the major memory with the new compressed data, and may be continuously recycled for the duration of the recording time interval. Various alternative schemes may be selected whereby the data is recycled only for one or two successive propagation times, after which it too is discarded.

Referring again to FIG. 1, the minor memory 36 comprises some number of nonvolatile memory devices 66, 68; the actual number depending on the input data rate, the input word bit size and the time interval established for the minor loop. The data is circulated through the minor memory in a first in first out manner to provide the functional loops illustrated in FIG. 3. This may be provided in alternative configurations of hardware and writing sequences e.g. the nonvolatile devices may be electronically alterable read only memories (EA-ROM) or electrically erasable read only memories ($E^2$-ROM) where new data is written into successive address locations after the older data is "shifted out". Alternatively the devices may be actual serial memory devices such as bubble memories which may be preferred due to their higher bit storage density. With continuing development the bubble memories will allow for significant increases in the number of flight parameters which may be recorded for a given configuration density. Magnetic bubble memories presently available from Texas Instruments and Intel include models with one megabit memory storage, with smaller sizes available from a number of various manufacturers. The range of available sizes allows for a latitude in selecting the actual number of memories required in each of the minor and major loops. For an input data rate of 768 BPS (46.1 KBPM) a single standard one megabit memory would provide a minor loop time interval of over twenty minutes.

The I/O lines 70, 72 to the minor memory loop are included within lines 74 from the system bus 32, and the major memory loop I/O lines 76, 78 are included in system bus lines 80. The major memory loop includes an equal or greater number of circulating memory devices 82, 84 which may be of the same type as those used in the minor loop. Typically, the total bit storage capacity of the major loop is equal to that of the minor loop, but real time signal propagation through the major loop varies since the data inserted includes both new and recirculated data. As in the minor memory loop the data with synch words is strobed through the memory devices with a clock signal from the CPU 42.

In operation, the flight recorder begins recording input data when electrical power is applied. The CPU synchronizes on the input data synch words and the data is recorded in the minor memory in real time. Compression and selective tagging of the data following circulation through the minor loop occurs in compressed time. In the embodiment of FIG. 1 it is assumed that the CPU operates on an interrupt format with priority given to loading input data into the minor loop.

Figure 4:
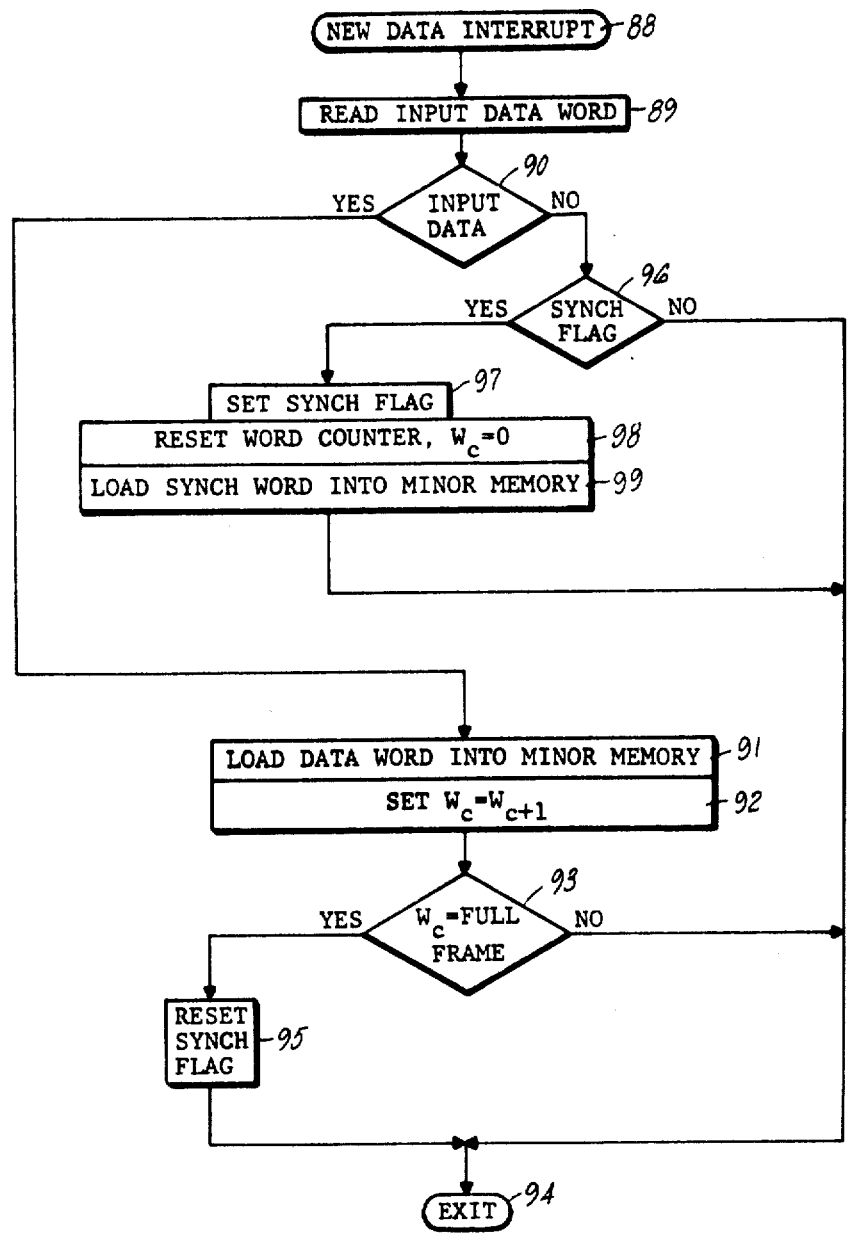
FIG. 4 is a simplified flow chart diagram of one set of functional routines performed by the system of FIG. 1 in its recording function.

The flowchart of FIG. 4 illustrates the steps performed by the CPU in loading input data to the minor memory. The CPU enters the subroutine following a NEW DATA INTERRUPT 88. Instructions 89 next require the CPU to read the input data word and decision 90 determines if the present input word is part of a data frame presently being received. If YES, instructions 91 load the data word into the minor memory and instructions 92 increment a frame word counter ($W_c$). Decision 93 determines if the present word count equals a full frame. If NO, the CPU exits at 94. If YES, instructions 95 reset the frame SYNCH FLAG which is reset on the appearance of the next received synch word, and the CPU exits the subroutine.

If the answer to decision 90 is NO, i.e. not a data word, decision 96 determines if the present input word is a synch word. If NO, the CPU exits; if YES, the CPU sets the SYNCH FLAG in instructions 97 and resets the word counter ($W_c=0$) for the upcoming new frame in instructions 98. Instructions 99 load the synch word into the minor memory, after which the CPU exits the subroutine. In each case where the CPU exits the subroutine it is recalled by a NEW DATA INTERRUPT.

Each input data word loaded in the minor memory forces out the earliest word then in memory. The CPU reads the minor memory output each time a new word is loaded in and performs a data compression routine to reduce the data base into a combination of slow periodic data samples and intermediate data samples indicating a parameter exceedance condition. This provides the typical thirty-five to one compaction of the sensed parameter information prior to recording into the major memory. The compression routine does not sacrifice the accuracy of the data record which remains as a quantitative account of each parameter's history. This results from the high frequency sampling of each parameter, e.g. at least each frame and in most instances on each subframe. This high frequency sampling is necessary to update related control system inputs, however, the recording of parameter values which do not change does not provide any more intelligence then the fact that the parameter has not changed. As such, the present data compression routine records each parameter at a selected periodic slow interval to provide periodic reference frames in the recorded data base. For a parameter sampled once per second a periodic slow interval may be once per minute; a 60 to 1 compression. The intermediate frame recording is on an "as required" basis as determined by a parameter value exceedance criteria. When each input data word is read by the CPU (89, FIG. 4) the data word parameter value is stored in RAM (46, FIG. 1) by the parameter ID. The next sample of the same parameter is compared with the preceding stored sample to determine whether the new sample exceeds preselected tolerance limits for the preceding value. If it has not, the sample is not recorded. If it has, the exceedance routine marks the new data word for storage in the major memory loop as in intermediate frame, together with the elapsed time from the preceding periodic frame. As a result the data loaded into the major memory loop is a succession of periodic and intermediate data frames. FIG. 2, illustration (c) represents a combination of periodic frames (1 and N) and intermediate exceedance parameters $X_1$, $Y_1$, which are formatted into the periodic and intermediate frames shown in illustration (d).

Prior to insertion into the major memory the periodic and intermediate frames may be discriminately labeled as PROTECT frames, as opposed to unlabeled, non-protect frames. The distinction becomes important with regard to the tenure of the compressed frame data in the major memory, e.g. the unprotected data is discarded after propagation through the major loop whereas the protected data is again recycled through the loop. The protect status arises in certain command situations, either through manual operator entry or by automatic alarm limit conditions on some sensed aircraft parameter, either of which are input to the CPU on lines 103. The data received during such a command is required to be protected e.g. tagged as PROTECT and recycled through the major loop continuously until it may be read out by the ground support equipment.

FIG. 2, illustration (e) shows a typical header format 104 which may be used for the compressed periodic and intermediate frames. The header identifying indicia typically includes: the number of data words in the frame (104a), the time (104b), the type frame (104c), and any PROTECT status (104d). The time may be either relative (with respect to the immediately preceding periodic frame) or real. The type frame is periodic or intermediate.

Figure 5:
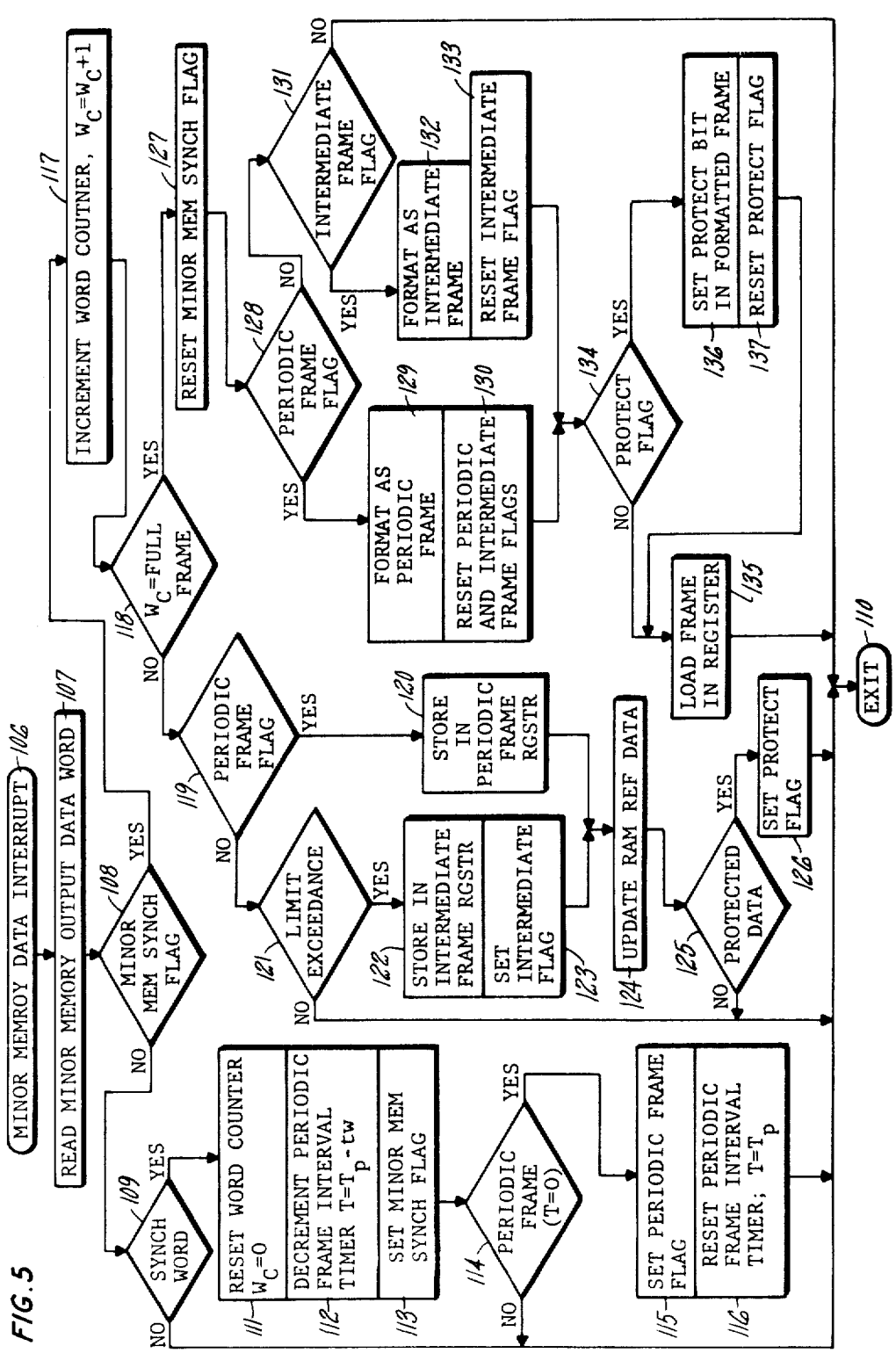
FIG. 5 is a simplified flow chart diagram of another set of functional routines performed by the system of FIG. 1 in its recording function.

FIG. 5 illustrates the steps performed by the CPU in compressing and formatting the periodic and intermediate frames for loading into the major memory. The CPU enters the subroutine on a MINOR MEMORY DATA INTERRUPT 106 and reads the minor memory output word in instructions 107. Decision 108 next determines if the MINOR MEM SYNCH FLAG is set, i.e. CPU synchronization with the data from the minor memory. Typically this flag is reset between frames so that if set it indicates that the present data is part of an ongoing frame, as opposed to the beginning of a new frame. If it is not set, decision 109 determines if the present output word is a synch word and if not the CPU exits the subroutine at 110. If a synch word, instructions 111 reset the word counter ($W_C=0$) indicating a new data frame. Instructions 112 decrement the periodic frame interval timer, i.e. the time period $T_P$ between selected periodic frames (FIG. 2(b)), by the word time $t_w$ and instructions 113 set the MINOR MEM SYNCH FLAG.

Although the synch flag is reset at the end of each frame there are a number of frames between successive periodic frames, such that decision 114 detects a periodic frame by determining if the period frame interval timer has decremented to zero ($T=0$). If YES, instructions 115 set the PERIODIC FRAME FLAG to indicate that the upcoming data frame from the minor memory is periodic frame; a slow interval sample to be recorded in the major memory. Instructions 116 reset the periodic frame timer ($T=T_P$) and the CPU exits at 110.

If the answer to decision 108 is YES, the present output data word from the minor memory is part of an ongoing data frame, and instructions 117 increment the word counter by one. Decision 118 next determines if the present word count indicates a full frame. If it is not a full frame decision 119 determines if the PERIODIC FRAME FLAG is set and if it is instructions 120 store the data word in a periodic frame register. If the PERIODIC FRAME FLAG is not set, i.e. the present frame is not part of a slow interval sample, then decision 121 determines if there is a "limit exceedance", i.e. whether the parameter value of the present data word exceeds the tolerance limits established for the immediately preceding sample of the same parameter stored in the RAM (46, FIG. 1). If NO, the CPU exits since there is no need to record the data word; it is neither a part of a periodic frame nor an exceedance parameter requiring its recording in an intermediate frame. If there is a limit exceedance instructions 122 store the data word in an intermediate frame register and instruction 123 set an INTERMEDIATE FLAG. Following instructions 120 or 123 instructions 124 require that the present parameter value be written into the RAM for reference update on the exceedance criteria for that parameter. Decision 125 next determines if there is a present protect command status for the data, i.e. whether the present data word was received by the recorder during a protect command state. If it is not protected data the CPU exists; if there is a requirement to protect then instructions 126 set the PROTECT FLAG after which the CPU again exists.

So far the flow chart of FIG. 5 indicates the steps performed by the CPU in setting the word counter, periodic frame timer and synch flag on detection of each new synch word, and for setting the periodic flag and intermediate flag on the basis of either the slow interval sample frequency or the existence of some parameter exceedance condition. The protect flag is set whenever there is an outstanding protect command status for the data. Following the determination of a full data frame in decision 118 instructions 127 reset the minor memory SYNCH FLAG which is set again (instructions 113) following detection of a new synch word (instructions 109). Decision 128 determines if there is a present periodic frame flag. If YES, instructions 129 format the data stored in the periodic frame register (instructions 120) into a periodic frame, including the header format described hereinbefore with respect to FIG. 2. Instructions 130 reset the PERIODIC FRAME FLAG and any outstanding INTERMEDIATE FRAME FLAG. If decision 128 determines that there is no present PERIODIC FRAME FLAG, then decision 131 checks for a present INTERMEDIATE FRAME FLAG. If NO, the CPU exists at 110; if YES, instructions 132 format the data stored in the intermediate frame register (instructions 122) into an intermediate frame and instructions 133 reset the INTERMEDIATE FRAME FLAG. Following instructions 130 or 133 decision 134 determines if there is a present PROTECT FLAG. If NO, instructions 135 load the formatted frame into a holding register for subsequent loading into the major memory. If there is a PROTECT FLAG then instructions 136 set the PROTECT BIT in the formatted frame and instructions 137 reset the PROTECT FLAG prior to the loading of the formatted frame into the output register, after which the CPU exists the subroutine.

In the flow chart of FIG. 5 the CPU performs data compression and frame formatting of the minor memory output data prior to loading it into the major memory. The periodic frame data is detected by the lapsed time ($T_P$) between period frames. All periodic frames are loaded into the major memory loop and, if tagged as protected data by setting the protect bit in the frame header, the periodic frame is recycled following exit from the major memory. The number of times that a protected frame is recycled is selectable, based on the particular recording time interval; it may occur once or a number of times over the recording time. The intermediate frame data is established only by the presence of some parameter limit exceedance. If there are no exceedance parameters between slow sample periodic frames, no intermediate frames are created. In the absence of intermediate frame data the minor loop output data is compressed to the slow time interval sample value.

Figure 6:
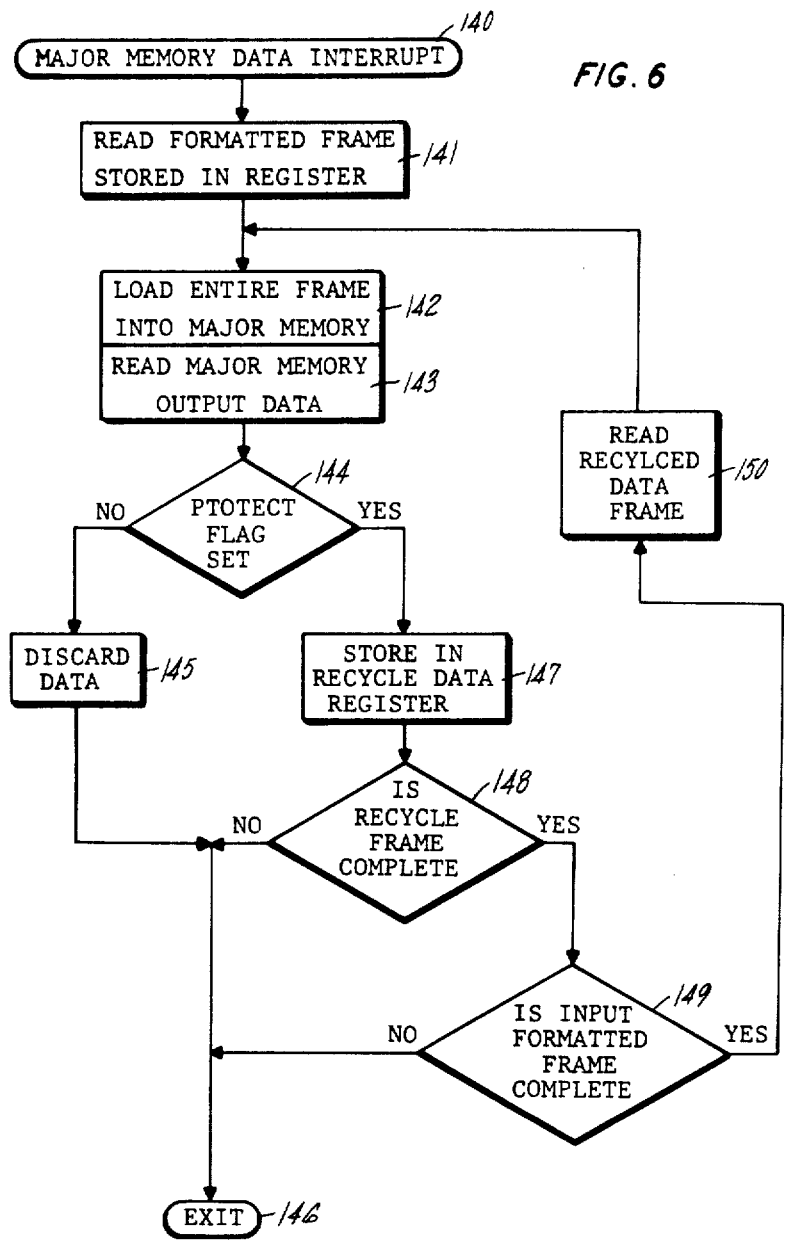
FIG. 6 is a simplified flow chart diagram of still another set of functional routines performed by the system of FIG. 1 in its recording operation.

The formatted frames are temporarily stored in register within the CPU, for loading into the major memory loop following a MAJOR MEMORY DATA INTERRUPT 140 in the subroutine illustrated in FIG. 6. Following CPU entry into the subroutine on the interrupt instructions 141 require the CPU to read the formatted frame stored in the CPU register(s). Instructions 142 load the entire frame into the major memory. Since each data entry pushes out data presently in the major memory loop, i.e. a FIFO sequence, instructions 143 require the CPU to read the major memory output data. Decision 144 determines if the protect bit is set in the major memory output data frame read in instructions 143. If NO, instructions 145 discard the data since no further storage is required, and the CPU exists at 146. If YES, instructions 147 require the major memory output data frame to be stored in a recycled data register within the CPU.

The amount of data pushed out of the major memory depends on the amount of data loaded in instructions 142. There is a coincident relationship; the major memory provides an output data bit for each input data bit. Since the input frames include varying length periodic frames and intermediate frames which are multiplexed into the major memory with recycled protected frames similarly of unequal lengths, the output data read from major memory loop will generally be an incomplete frame. Therefore, decision 148 determines if the recycled frame stored in the recycle register is complete. If NO, the CPU exists the subroutine at 146. If YES, decision 149 determines if the newly formatted compressed data frame is completely loaded in. If NO, the CPU again exists the subroutine. In this case the additional output data forced from the major memory, beyond that of the already complete recycled frame, is accumulated in the recycle register. If the answer to decision 149 is YES, instructions 150 requires that the CPU read the recycled data frame stored in register after which instruction 142 again load the entire frame into the major memory. This of course pushes out further data from the major memory loop which then must either be discarded or recylced if it is protected data.

The solid-state flight data recorder of the present invention provides a high reliability, accurate recording device for preserving flight data in a nonvolatile solid-state memory. The high reliability recording is due both to the inherent reliability of the solid-state components, but also to the practicality of providing built-in test routines which periodically determine operation of the recorder through self health routines. The built-in test features, which are not part of the present invention but which are well known in ground based solid-state devices, are impractical in present state of the art electromechanical flight recorders. In addition, the elimination of mechanical components in the present recorder provides a dramatic increase in reliability over the prior art devices.

The present solid-state flight recorder is adaptable, with expandable memory sizes for both the minor and major memory loops. This is made possible by the minor loop/major loop architecture and the data compression techniques which qualify data storage as to that which is significant, thereby exploiting every opportunity to minimize the required storage capacity. The most recently sampled flight data is recorded in tact in the minor memory loop; the actual time duration of the minor loop being established based on that deemed most critical. The major loop data includes slow speed data samples together with intermediate "exceedance parameters" which occur between the periodic samples, so as to permit accurate reconstruction of the recorder parameter excursions over the total recording interval.

Each of the memory loops may be expanded and with the continuing IC technological advances in chip densities the potential exists for recording intervals greater than the present 25 hour interval.

Although the invention has been shown and described with respect to the best mode embodiment thereof, it should be understood by those skilled in the art that the foregoing and various other changes, omissions and deletions in the form and detail thereof may be made therein without departing from the spitit and scope of this invention.

I claim:

1. A digital flight data recorder for recording units of signal information representing repetitively sampled aircraft operating parameters presented in series repeating data frames within a recording time period, comprising:

minor memory means, having an input for receiving each series data frame and having an output, said minor memory circulating each received data frame therethrough, as received, in a preserved first-in first-out (FIFO) sequence to said output, whereby the current data frames circulating therethrough represent the information received in a most recent value real time interval less than the recording time period;

major memory means, having an input and an output, for circulating in FIFO sequence selected units of information presented to said input therethrough to said output; and signal processing means, responsive to said minor memory means and said major memory means, for compressing said received series data frames appearing at said minor memory output so as to select therefrom successive ones of said received data frames as said selected units of information and to present said selected units of information to said major memory means, whereby said selected units of information in said major memory are represent the units of information received in the recording time period and said series data frames in said minor memory represent the units of information received within a most recent time interval of the recording period.

2. The apparatus of claim 1, wherein said compressing performed by said signal processing means includes the selection and presentation to said major memory means of periodic ones of said received data frames as said selected units of information, said periodic data frames being those appearing at equal periodic time intervals in said preserved sequence of received data frames from said minor memory means.

3. The apparatus of claim 2, wherein said compressing performed by said signal processing means in providing said selected units of information further includes the selection of parameter data from those of said preserved sequence of received data frames intermediate to said periodic data frames.

4. The apparatus of claim 3, wherein said signal processing means provides said selected parameter data from said intermediate data frames as selected information only in response to one or more parameter values in a present intermediate data frame exceeding, by a selected tolerance value, the value of the same parameter received in a preceding data frame, said processing means comparing each parameter of each received data frame with the preceding value of the same parameter in a prior received data frame to determine the existence of said exceedance condition.

5. The apparatus of claim 1, wherein said signal processing means is further responsive to protect data command signals presented thereto for providing, in the presence of said protect command signal, protect status to said selected periodic data frames and said selected parameter data from said intermediate data frames, said signal processing means presenting all of said selected units of information to said major memory means for circulation in said FIFO sequence therethrough at least one time, said signal processing means further providing for each of said protected selected units of information presented at said major memory means output following circulation therethrough, recycling and repeat circulation thereof back through said major memory means, whereby said protected units of information are recycled and circulated one or more times through said major memory means over said recording time period.

6. The apparatus of claim 5, wherein each of said protect data command signals are associated with one or more sensed parameters included within the received successive data frames, and wherein said signal processing means provides said protect status to said selected units of information, discriminately, only to those of said selected units of information which include said parameters associated with said protect data command signals.

7. The apparatus of claim 6, wherein said protect data command signals represent, for each associated aircraft parameter, an alarm limit indicative of the associated parameter value being greater than a preselected maximum or minimum tolerance value established for that parameter.

8. The apparatus of claim 6, wherein said protect data command signals are presented to said signal processing means in response to manual operator entry.

9. The apparatus of claim 1, wherein said minor memory means and said major memory means each comprise nonvolatile memory means for providing said FIFO sequence storage of data therein.

10. The apparatus of claim 9, wherein said nonvolatile memory means comprise magnetic bubble memories.

11. In a method of recording units of signal information representing repetitively sampled aircraft operating parameters presented in series repeating data frames within a recording time period, the steps of:

receiving each serial data frame;

circulating each of said received data frames in a preserved first-in first-out (FIFO) sequence through a first signal memory, such that the data frames circulating therethrough represent all of the information received in a most recent, selected value real time interval less than the recording time period;

editing the preserved sequence of received data frames as they appear following said FIFO sequence through said first signal memory to designate therefrom successive ones of said received data frames as selected units of information;

presenting said selected units of information to a second signal memory; and circulating said selected units of information in a second FIFO sequence through said second signal memory, whereby said selected units of information in said second signal memory represent the earlier units of information received in the recording time period and said preserved sequence of data frames in said first signal memory represent the latest units of information received within a most recent time interval of the recording period.

12. The method of claim 11, wherein said step of editing includes:

designating as said selected units of information periodic ones of said preserved data frames appearing in equal periodic time intervals following said first FIFO sequence through said first signal memory.

13. The method of claim 12, wherein said step of editing further includes, in addition to said step of designating periodic data frames, the step of indicating as additional selected units of information selected data appearing in said preserved data frames presented intermediate to said periodic data frames in said FIFO sequence from said first signal memory.

14. The method of claim 13, wherein said step of indicating further includes the steps of:

comparing each parameter in each of said intermediate data frames with the preceeding value of the same parameter appearing in a prior received data frame to determine if the present parameter value exceeds, by a selected tolerance value, the value of the same parameter in said prior received data frame; and providing said intermediate data frames only in response to the presence of one or more parameter values in a present intermediate data frame exceeding the value of the same parameter presented in an immediately preceding data frame.

15. The apparatus of claim 11, wherein said step of editing further includes the steps of:

monitoring the presence of protect data command signals appearing simultaneously with the sampled aircraft operating parameters;

marking those of said selected periodic data frames and said selected data of said intermediate data frames received in the presence of said protect data command signals with a protected status indication prior to presentation to said second memory; and recycling for repeat circulation, following said first circulation of all of said selected units of information through said second signal memory, said protected selected units information back through said second signal memory, whereby said protected selected information is recycled one or more times through said second signal memory over said recording time period.

16. The method of claim 11, wherein said first step of circulating and said second steps of circulating are performed in signal memories comprising nonvolatile memory storage devices.

17. The method of claim 15, wherein said nonvolatile memory storage devices comprise magnetic bubble memories.

* * * * *